US008589672B2

(12) United States Patent
Dasari et al.

(10) Patent No.: US 8,589,672 B2
(45) Date of Patent: Nov. 19, 2013

(54) METHOD FOR SECURELY MERGING MULTIPLE NODES HAVING TRUSTED PLATFORM MODULES

(75) Inventors: Shiva R. Dasari, Austin, TX (US); Lee H. Wilson, Austin, TX (US); Scott N. Durham, Raleigh, NC (US); Sumeet Kochar, Apex, NC (US); William B. Schwartz, Apex, NC (US); Kenneth A. Goldman, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 1405 days.

(21) Appl. No.: 12/270,888

(22) Filed: Nov. 14, 2008

(65) Prior Publication Data

US 2010/0125731 A1 May 20, 2010

(51) Int. Cl.
*H04L 29/06* (2006.01)
*H04L 9/00* (2006.01)
*G06F 12/14* (2006.01)
*G06F 15/16* (2006.01)

(52) U.S. Cl.
USPC .......................................... 713/155; 726/12

(58) Field of Classification Search
USPC ................................................ 713/155, 201
See application file for complete search history.

(56) References Cited

U.S. PATENT DOCUMENTS

| 6,256,740 | B1 * | 7/2001 | Muller et al. | 726/12 |
| 6,993,648 | B2 | 1/2006 | Goodman et al. | |
| 7,146,497 | B2 | 12/2006 | Almeida et al. | |
| 7,191,464 | B2 | 3/2007 | Cromer et al. | |
| 2002/0184532 | A1 | 12/2002 | Hackenberger et al. | |
| 2004/0151319 | A1 | 8/2004 | Proudler | |
| 2005/0246525 | A1 | 11/2005 | Bade et al. | |
| 2007/0260545 | A1 | 11/2007 | Bade et al. | |

OTHER PUBLICATIONS

Wikipedia "Cryptographic Hash Function", http://en.wikipedia.org/wiki/Cryptographic_hash_function, Oct. 2, 2008, pp. 1-8.
Liu Jin-Sen, "A TPM Authentication Scheme for Mobile IP", 2007 International Conference on Computational Intelligence and Security Workshops, IEEE Computer Society, pp. 721-724.

* cited by examiner

*Primary Examiner* — Shin-Hon Chen
(74) *Attorney, Agent, or Firm* — Thomas E. Tyson; Jeffrey L. Streets

(57) ABSTRACT

Method, apparatus and computer program product are provided for operating a plurality of computer nodes while maintaining trust. A primary computer node and at least one secondary computer node are connected into a cluster, wherein each of the clustered computer nodes includes a trusted platform module (TPM) that is accessible to software and includes security status information about the respective computer node. Each clustered computer node is then merged into a single node with only the TPM of the primary computer node being accessible to software. The TPM of the primary computer node is updated to include the security status information of each TPM in the cluster. Preferably, the step of merging is controlled by power on self test (POST) basic input output system (BIOS) code associated with a boot processor in the primary node.

20 Claims, 2 Drawing Sheets

METHOD FOR SECURELY MERGING MULTIPLE NODES HAVING TRUSTED PLATFORM MODULES

BACKGROUND OF THE INVENTION

1. Field of the Invention

The present invention relates broadly to security in multi-node systems, and more specifically to the use of trusted platform modules in multi-node systems.

2. Background of the Related Art

A "trusted platform module" (TPM) is a processor chip that implements a specification published by the Trusted Computing Group (TCG) detailing a secure crypto-processor that can store cryptographic keys that protect information. A trusted platform module offers a number of capabilities, including "remote attestation" which creates a nearly unforgeable hash of the hardware and software configuration. If it is detected that a hash has changed, then this indicates that the hardware or software has been modified and trust may be lost.

A TPM chip is typically installed on a motherboard. Systems that are compliant with Trusted Computing Group (TCG) specifications support the following requirements:

- Hardware and software for Core Root for Trusted Measurement (CRTM)
- Immutable CRTM
- Application level interface (INT 1A calls)
- Event Logging
- Measurement of code before it is executed
- User level Trusted Platform Module (TPM) management functions
- ACPI support for operating system to identify and make use of TPM etc.

The above tasks are documented in the TCG specifications.

BRIEF SUMMARY OF THE INVENTION

One embodiment of the present invention provides a method of operating a plurality of computer nodes. The method includes connecting a primary computer node and at least one secondary computer node into a cluster, wherein each of the clustered computer nodes includes a trusted platform module that is accessible to software and includes security status information about the respective computer node. Each of the clustered computer nodes are then merged into a single node with only the trusted platform module of the primary computer node being accessible to software. The trusted platform module of the primary computer node is updated to include the security status information of each trusted platform module in the cluster. Preferably, the step of merging is controlled by power on self test (POST) basic input output system (BIOS) code associated with a boot processor in the primary node. Optionally, the step of merging includes reading and extending the security status information from a platform configuration register (PCR) within the trusted platform module of each secondary node to a platform configuration register (PCR) within the trusted platform module of the primary node.

Another embodiment of the invention provides a computer program product including computer usable program code embodied on a computer usable medium for merging multiple computer nodes connected into a cluster. The computer program product includes computer usable program code for updating the trusted platform module of the primary computer node to include the security status information of each trusted platform module in the cluster, computer usable program code for reconfiguring hardware registers that control system resources in the cluster, computer usable program code for allowing only the trusted platform module of a single primary computer node to be accessible to software, and computer usable program code for maintaining a chain of trust between each of the clustered computer nodes during the merger into a single node.

DETAILED DESCRIPTION OF THE INVENTION

Figure 1:
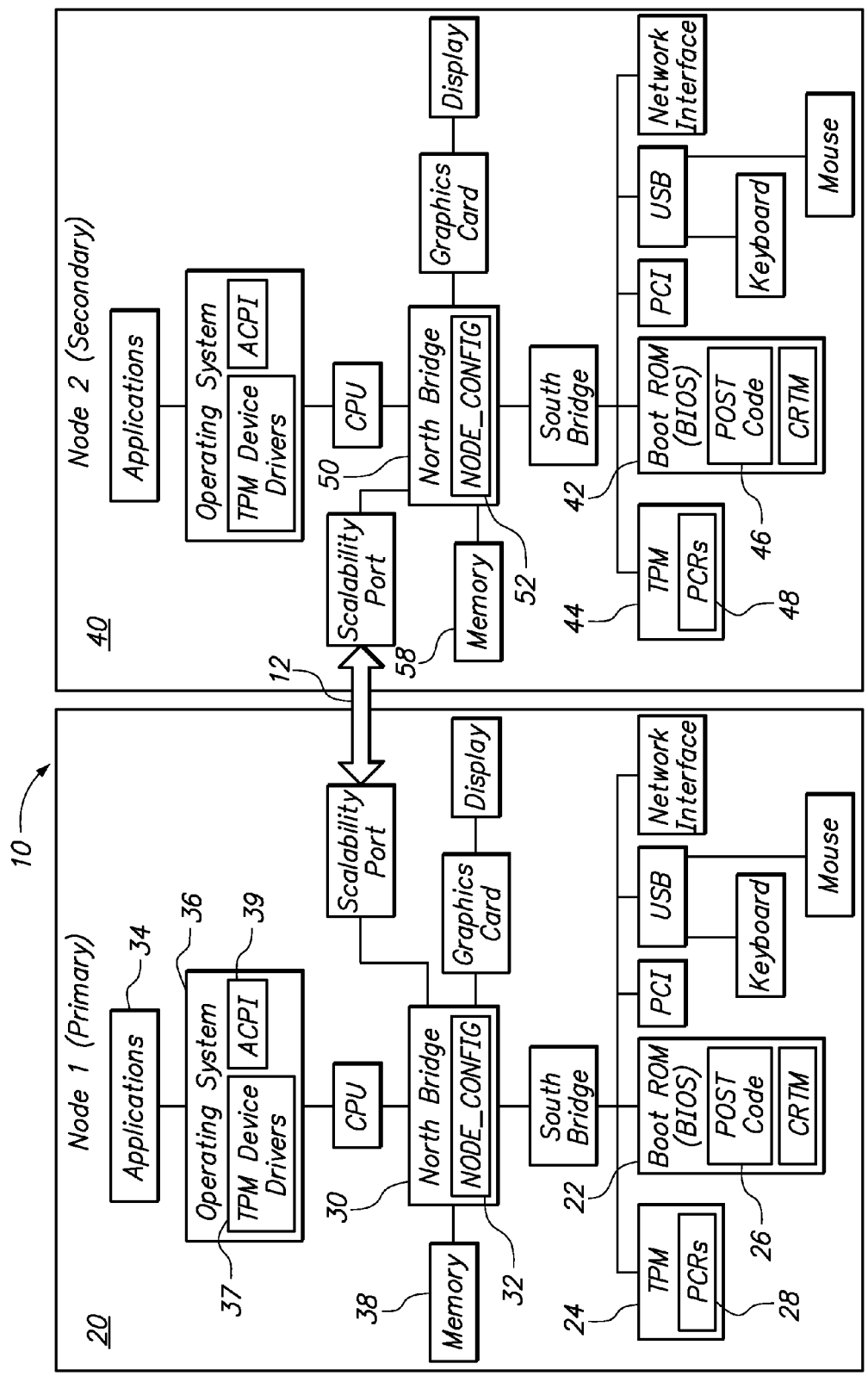
FIG. 1 is a block diagram of two computer nodes arranged in a cluster through a scalability connection.

One embodiment of the present invention provides a method of operating a plurality of computer nodes. The method includes connecting a primary computer node and at least one secondary computer node into a cluster, wherein each of the clustered computer nodes includes a trusted platform module that is accessible to software and includes security status information about the respective computer node. Each of the clustered computer nodes are then merged into a single node with only the trusted platform module of the primary computer node being accessible to software. The trusted platform module of the primary computer node is updated to include the security status information of each trusted platform module in the cluster.

Optionally, the step of merging includes reading and extending the security status information from a platform configuration register (PCR) within the trusted platform module of each secondary node to a platform configuration register (PCR) within the trusted platform module of the primary node. A platform configuration register contains information about each of the firmware modules that are part of the node containing the PCR. Firmware modules may include, without limitation, POST, Option ROMs, CMOS/NVRAM, and Master Boot Record (MBR).

Preferably, the step of merging is controlled by power on self test (POST) basic input output system (BIOS) code associated with a boot processor in the primary node. Accordingly, the POST BIOS code in the primary node issues commands to the TPM of each secondary computer node, including the PCR read command.

In another embodiment of the invention, the step of merging includes reconfiguring hardware registers that control all system resources in the cluster. These registers are typically located in the CPU, Northbridge and Southbridge. Examples of these registers may include, without limitation, memory map registers, memory size registers, PCI MMIO hole registers, and PCI registers. These registers may, for example, be configured by POST issuing appropriate write cycles from the CPU.

In a further embodiment, a chain of trust is maintained between each of the clustered computer nodes during the merger into a single node. Although each of the computer nodes includes a trusted platform module that verifies the integrity of the software on that individual node, it is beneficial to maintain trust as the cluster of nodes is merged into a single node and operated as a single node. The method may implement with a primary computer node and a single secondary computer node, or with a primary computer node and two or more secondary computer nodes. Wherein two or more secondary computer nodes are to be merged, the method preferably includes completing a merge of a first secondary computer node before beginning to merge a second secondary computer node.

In a still further embodiment, TPM commands directed to the PCRs and data read from the PCRs are routed between the primary node and the at least one secondary node through a security specific register. Furthermore, the security specific register may be used to direct communications between the POST BIOS code and the TPM that are both within the primary node as well as in secondary node. In either type of communication, the POST BIOS code may use the security specific register to allow a TPM memory-mapped input output (MMIO) operation to be routed to any of the plurality of nodes in the cluster. A non-limiting example of a security specific register is the NODECONFIG register available in certain IBM node controller/memory controller chip designs or "chip sets" that include scalability ports. The scalability ports are used for connecting each of the computer nodes into a cluster.

In yet another embodiment, only the TPM on the primary computer node is allowed to respond to system software following the merge. The system software may include the rest of the POST, application programs and/or operating systems, optionally accessing the TPM through use of advanced configuration and power interface (ACPI) architecture. System software is prevented from accessing the TPM of the secondary node. It is the TPM of the primary node that is responsible for responding to the system software.

It should be recognized that during the merger of computer nodes, all TPMs must be accessible by the BIOS even though they may be located at conflicting addresses. However, after the computer nodes have been merged, the TPMs in the secondary nodes are made inactive and invisible to system software. This is achieved by setting the NODECONFIG register to point to the TPM of the primary node.

Although the identify of the primary computer node is preferably predetermined, the present invention encompasses systems and methods that select the primary computer node during boot process or based upon some predetermined selection criterion.

Another embodiment of the invention provides a computer program product including computer usable program code embodied on a computer usable medium for merging multiple computer nodes connected into a cluster. The computer program product includes computer usable program code for updating the trusted platform module of the primary computer node to include the security status information of each trusted platform module in the cluster, computer usable program code for reconfiguring hardware registers that control system resources in the cluster, computer usable program code for allowing only the trusted platform module of a single primary computer node to be accessible to software, and computer usable program code for maintaining a chain of trust between each of the clustered computer nodes during the merger into a single node.

In yet another embodiment, the computer usable program code for updating the trusted platform module of the primary computer node includes computer usable program code for reading and extending the security status information from a platform configuration register (PCR) within the trusted platform module of each secondary node to a platform configuration register (PCR) within the trusted platform module of the primary node.

In a still further embodiment, the computer usable program code is included in power on self test (POST) basic input output system (BIOS) code associated with a boot processor in the primary node.

FIG. 1 is a block diagram of two computer nodes arranged in a cluster 10 through a scalability connection 12. The cluster 10 includes a primary node 20 and at least one secondary node 40 (only one shown). The architecture of each node is shown to be the same, but may vary in the types of system resources that are included or coupled to each node. Many of the individual components of the nodes are not specific to the apparatus and method of the present invention and will not be referenced. However, the primary computer node 20 and each secondary computer nodes 40 include a basic input/output system (BIOS) 22, 42, respectively, and a trusted platform module (TPM) 24, 44, respectively. No attempt is made to show or discuss every aspect or feature of the BIOS or TPM, but the BIOS is shown to include power on self test (POST) code 26, 46. Each TPM includes a plurality of PCRs 28, 48, respectively, for storing security information about the components of the respective node.

The North Bridge 30, 50, or other part of the chipset, includes a security specific register shown as NODECONFIG register 32, 52, respectively. The POST BIOS code 26 of the primary BIOS 22 may selectively configure the NODECONFIG register 32 to direct commands to the TPM 44 on the secondary node 40 (through the scalability connection 12) or to the TPM 24 on the primary node 20. Accordingly, the BIOS 22 can control two-way communication between the TPMs 24, 44. The POST BIOS code in each node 20, 40 may be identical, yet the POST BIOS code 26 of the primary node 20 takes control of the merge process, while the POST BIOS code 46 of the secondary node becomes inactive once the secondary node becomes involved in the merge process.

According to one embodiment, the POST BIOS code 26 can directly read PCRs 48 of the TPM 44 located on the secondary node 40 and extend the contents of the PCRs 48 to the TPM 24 located on the Primary node 20. This is achieved by configuring the hardware, such as the NODECONFIG register, in such a way that at any time only one TPM responds in a multi-node system (i.e., a "cluster"). The required PCR is read from the secondary node, the system is reconfigured to allow access to the TPM on the primary node, and then the data read from secondary nodes is extended to the TPM located on the primary node. By repeating this process with each secondary node in the cluster, the PCRs 28 on the primary node 20 will include security information that reflects all of the system resources in the cluster 10.

After a successful merge, applications 34 and/or operating system 36 may access the TPM 24. Optionally, the operating system may utilize the TPM device drivers 37. The operating system, obtains information about TPM status using the advanced configuration and power interface (ACPI) 39, as necessary. For example, the operating system and/or applications may use ACPI to obtain information about the TPM device, such as TPM address and TPM status. If an application program or operating system needs access to system resources on the secondary node 40, the Northbridge 30 routes these accesses to Northbridge 50 on the secondary node 40 and then to the memory 58. For example, the operating system 36 may effectively store information on the memory 58 on the secondary node 40 as well as the memory 38 on the primary node 20. It should be recognized that the NODECONFIG register is only involved during the merge. Other registers, such as memory map, memory size, PCI MMIO hole size register, are involved in subsequent operations, such as the access to memory 58 as described above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
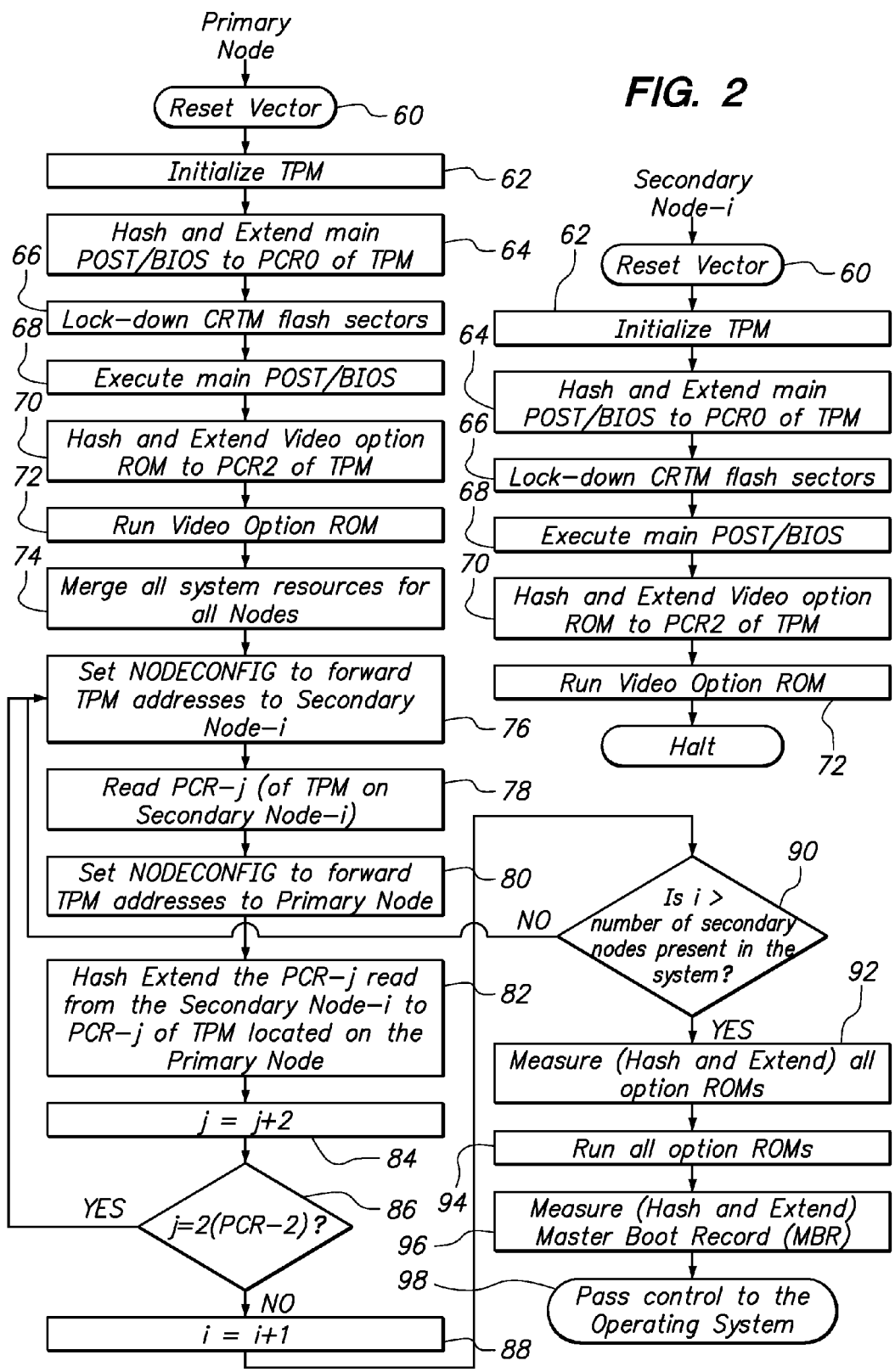
FIG. 2 is a flow chart of a method for merging nodes in a cluster.

FIG. 2 is a flow chart of a method for merging nodes in a cluster, such as the primary and second nodes 20, 40 shown in FIG. 1. The method utilizes a security specific register that allows a TPM MMIO operation to be routed to any of the nodes in the cluster. As used herein, this security specific register will be referred to as the NODECONFIG register. This register and the procedure of utilizing this register are general in nature and could be applied to many different implementations. For example, such a register is available in an IBM node controller/memory controller chip design used in IBM system x3850.

Other registers utilized in this method are discussed in Trusted Computing Group (TCG) specifications which are publicly available. TPMs have multiple Platform Configuration Registers (PCRs) which are referred to in this invention as PCR(0), PCR(1), etc. through PCR(j).

In reference to FIG. 2, each of the nodes in the cluster is initially in an unmerged state with a separate copy of BIOS running independently on each node. The BIOS in each node performs a series of security specific tasks prior to the merge. In step 60, each central processing unit (CPU) is reset and executes a first instruction found in a default location or address known as the reset vector. In step 62, the local TPM is initialized, for example by the BIOS sending the commands TPM_Startup and TPM_ContinueSelfTest. In step 64, the main POST/BIOS code is hashed and extended to PCR(0) of the local TPM. A "hash" of "hash function", such as the secure hash algorithm (SHA-1), is a well-defined procedure or mathematical function that turns some kind of data into a relatively small integer. A good hash function will be deterministic, meaning that two identical or equivalent inputs will generate the same hash value. In accordance with TCG specifications, if the hash of certain program code is different than the previous hash of that program code, then the code has been altered in some way and should not be trusted. Although the present method does not specifically call out the steps of comparing a current hash to a previous hash, this method will preferably include steps established by the TCG specifications to verify and maintain trust among the nodes.

In step 66, CRTM flash sectors are locked down. This flash lock down is achieved either by issuing lock-down command to the flash chip or setting external logic to lock the flash chip. Once it is locked down, the flash contents can not be altered. This is necessary to establish core root of trust. Next, in step 68, the main POST/BIOS code, which has already been measured (i.e., hashed) and extended to PCR(0) of the local TPM, is executed in each node. In step 70, the video option ROM is measured and extended to PCR(2) of the local TPM, and then, in step 72, the video option ROM is executed.

Following the completion of steps 60 through 72 in the secondary node(s), the BIOS does not continue to run. Rather, the BIOS of each secondary node is placed in a non-intrusive state that does not cause any memory, IO or MMIO operations in the system. Only one processor in the system, referred to as the boot processor, will continue to run BIOS. The node that includes the boot processor is called the primary node. All other nodes are referred to as secondary nodes.

The boot processor then continues to execute the POST/BIOS code in the primary node in accordance with steps 74 through 90. In step 74, system resources for all nodes are merged, such as by identifying their memory addresses and I/O addresses to the BIOS. This requires the BIOS to reconfigure hardware registers that control all these system resources. In step 76, the NODECONFIG register is configured or set to forward TPM addresses to a selected secondary node (i.e., secondary node (i)). As shown later in step 90, steps 76 through 86 are repeated for each secondary node that is being merged. In step 78, the boot processor reads the data from a specified PCR(j) of the TPM of the selected secondary node. This may be accomplished, for example, by issuing a TPM_ORD_PCRRead command to read PCR(j) of the secondary node. Then, in step 80, the NODECONFIG register is configured or set to forward TPM addresses to the primary node. In step 82, the data read from PCR(j) in step 78 is hashed and extended to PCR(j) of the TPM located on the primary node.

In step 84, the initial value of j=0 is incremented by two (2) so that j=2. In step 86, the method returns to repeat steps 76 through 82 for PCR(2). Accordingly, the steps 76-82 are first executed to read, hash and extend PCR(0) from the secondary node to PCR(0) of the primary node, and then executed to read, hash and extend PCR(2) from the secondary node to PCR(2) of the primary node. In step 88, the value of i is incremented to select the next secondary node to be merged. In step 90, if i is not greater than the total number of nodes being merged, then the method returns to step 76 for merging the next node. The value of j should be reset to zero (0) before beginning to merge each secondary node.

After the secure merge of the system's TPM and system resources has been accomplished for all nodes, the system boot is completed in a conventional manner by continuing with the POST/BIOS execution (controlled by the primary node). For example, all options ROMs are measured in step 92 and executed in step 94. In step 96, the master boot record (MBR) is measured (i.e., hashed and extended). Finally, step 98 passes control to the operating system. Having merged all system resources and passed control to the operating system, the operating system can control and access each of the system resources and make them available to application programs. The cluster then operates as a single merged node that maintains the trust intended for individual nodes having a single trusted platform module.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    connecting a primary computer node and at least one secondary node into a cluster, wherein each of the clustered computer nodes includes a trusted platform module that is accessible to software and includes security status information about the respective computer node;
    merging each of the clustered computer nodes into a single node with only the trusted platform module of the primary computer node being accessible to software, wherein the trusted platform module of the primary computer node is updated to include the security status information of each trusted platform module in the cluster; and
    maintaining a chain of trust between each of the clustered computer nodes during the merger into a single node.

2. The method of claim 1, wherein the step of merging is controlled by power on self test (POST) basic input output system (BIOS) code associated with a boot processor in the primary node.

3. The method of claim 1, wherein the step of merging includes reconfiguring hardware registers that control all system resources in the cluster.

4. The method of claim 1, further comprising:
    reading and extending the security status information from a platform configuration register (PCR) within the trusted platform module of each secondary node to a platform configuration register (PCR) within the trusted platform module of the primary node.

5. The method of claim 4, wherein the step of reading and extending is controlled by POST BIOS code associated with a boot processor in the primary node.

6. The method of claim 4, further comprising:
allowing only the TPM on the primary computer node to respond to system software.

7. The method of claim 1, further comprising:
using a security specific register to allow a TPM memory-mapped input output (MMIO) operation to be routed to any of the plurality of nodes in the cluster.

8. The method of claim 7, further comprising:
routing TPM commands and data between the primary node and the at least one secondary node through the security specific register.

9. The method of claim 1, further comprising:
the software accessing the trusted platform module of the primary node using the information presented in advanced configuration and power interface (ACPI) architecture.

10. The method of claim 1, wherein the software includes basic input output system code.

11. The method of claim 1, wherein the software includes operating system software.

12. The method of claim 1, wherein the software accessible trusted platform module is included in a predetermined primary computer node of the cluster.

13. The method of claim 1, wherein the at least one secondary computer node includes two or more secondary computer nodes.

14. The method of claim 13, wherein each of the primary and secondary computer nodes includes a chipset with a scalability port to facilitate connection into a cluster.

15. The method of claim 1, further comprising:
preventing software access to the TPM of the secondary node after all of the security information from the PCRs of the secondary node have been read and extended to the primary node.

16. The method of claim 1, further comprising:
completing a merge of a first secondary computer node before beginning to merge a second secondary computer node.

17. The method of claim 1, wherein the step of connecting a primary computer node and at least one secondary computer node into a cluster includes using a scalability link.

18. A computer program product including computer usable program code embodied on a non-transitory computer usable storage medium for merging multiple computer nodes connected into a cluster, the computer program product including:
computer usable program code for updating the trusted platform module of the primary computer node to include the security status information of each trusted platform module in the cluster;
computer usable program code for reconfiguring hardware registers that control system resources in the cluster;
computer usable program code for allowing only the trusted platform module of a single primary computer node to be accessible to software;
computer usable program code for maintaining a chain of trust between each of the clustered computer nodes during the merger into a single node.

19. The computer program product of claim 18, wherein the computer usable program code for updating the trusted platform module of the primary computer node includes computer usable program code for reading and extending the security status information from a platform configuration register (PCR) within the trusted platform module of each secondary node to a platform configuration register (PCR) within the trusted platform module of the primary node.

20. The computer program product of claim 18, wherein the computer usable program code is included in power on self test (POST) basic input output system (BIOS) code associated with a boot processor in the primary node.

* * * * *